(12) United States Patent
Beckington

(10) Patent No.: US 7,785,046 B2
(45) Date of Patent: Aug. 31, 2010

(54) TOOL COOLANT APPLICATION AND DIRECTION ASSEMBLY

(75) Inventor: Kevin Beckington, Ann Arbor, MI (US)

(73) Assignee: Advanced Industries, Chelsea, MI (US)

( * ) Notice: Subject to any disclaimer, the term of this patent is extended or adjusted under 35 U.S.C. 154(b) by 68 days.

(21) Appl. No.: 11/636,012

(22) Filed: Dec. 7, 2006

(65) Prior Publication Data

US 2007/0077132 A1    Apr. 5, 2007

Related U.S. Application Data

(63) Continuation-in-part of application No. 11/098,979, filed on Apr. 5, 2005, now abandoned, which is a continuation-in-part of application No. 10/197,390, filed on Jul. 17, 2002, now Pat. No. 7,134,812.

(51) Int. Cl.
    *B23C 5/28* (2006.01)
    *B23Q 11/00* (2006.01)

(52) U.S. Cl. .............. 408/56; 408/61; 279/20; 409/136; 407/11

(58) Field of Classification Search ............ 408/56, 408/57, 60, 61; 409/135, 136; 279/20; 407/11; *C23Q 11/00; B23C 5/28*
See application file for complete search history.

(56) References Cited

U.S. PATENT DOCUMENTS

| | | | |
|---|---|---|---|
| 1,617,554 A | 2/1927 | Swartz | |
| 2,343,632 A | 3/1944 | Bakewell | |
| 2,491,635 A | 12/1949 | Allen, Jr. | |
| 2,669,889 A | 2/1954 | Huller | |
| 2,690,149 A * | 9/1954 | Adams | 112/281 |
| 2,692,996 A | 11/1954 | Wallace | |
| 2,916,749 A | 12/1959 | Ingwer et al. | |
| 2,996,061 A | 8/1961 | Miller | |
| 3,176,330 A | 4/1965 | Jennings | |
| 3,460,410 A * | 8/1969 | Briles | 408/57 |
| 3,461,750 A | 8/1969 | Achelis et al. | |
| 3,583,383 A | 6/1971 | Ovshinsky | |
| 3,609,931 A * | 10/1971 | Voorhies | 451/450 |
| 3,868,195 A | 2/1975 | Anderson et al. | |
| 3,874,808 A * | 4/1975 | Zaccardelli et al. | 408/1 R |
| 3,908,510 A | 9/1975 | Koskolos et al. | |
| 4,213,354 A * | 7/1980 | Dahinden | 82/1.11 |
| 4,570,952 A | 2/1986 | Heimbigner et al. | |
| 4,636,118 A * | 1/1987 | Hunt | 409/136 |
| 4,669,933 A * | 6/1987 | Dye | 409/136 |
| 4,770,570 A | 9/1988 | Tsui et al. | |
| 4,795,292 A * | 1/1989 | Dye | 409/136 |
| 4,838,136 A * | 6/1989 | Kress et al. | 82/130 |

(Continued)

FOREIGN PATENT DOCUMENTS

JP    2004148429    5/2004

*Primary Examiner*—Boyer D Ashley
*Assistant Examiner*—Sara Addisu
(74) *Attorney, Agent, or Firm*—Carlson, Gaskey & Olds

(57) ABSTRACT

A tool holder includes an insert having an annular channel in fluid communication with an inlet. The insert mounts within a body that provides for rigidly mounting the tool to the machine. Coolant flow through the inlet and annular channel exits the insert through passages directing coolant fluid along the axis of the tool. The passages are annularly disposed about a face of the insert for directing coolant fluid along the tool.

12 Claims, 1 Drawing Sheet

U.S. PATENT DOCUMENTS

| | | | |
|---|---|---|---|
| 4,907,662 A * | 3/1990 | Deane et al. | 175/431 |
| 4,911,253 A | 3/1990 | Cliche | |
| 4,949,813 A | 8/1990 | Kidder et al. | |
| 5,163,790 A | 11/1992 | Vig | |
| 5,190,421 A | 3/1993 | Wen et al. | |
| 5,275,516 A | 1/1994 | Liaw | |
| 5,358,360 A * | 10/1994 | Mai | 408/61 |
| 5,402,696 A * | 4/1995 | Hecht et al. | 82/158 |
| 5,660,510 A | 8/1997 | Taniguchi et al. | |
| 5,993,121 A | 11/1999 | Fiesta | |
| 6,059,702 A * | 5/2000 | Winkler et al. | 483/13 |
| 6,857,344 B1 * | 2/2005 | Diller | 82/1.2 |
| 2002/0033081 A1 | 3/2002 | Hara | |
| 2002/0145260 A1 | 10/2002 | Komine et al. | |
| 2004/0013480 A1 * | 1/2004 | Beckington | 408/61 |
| 2004/0067113 A1 * | 4/2004 | Sugata et al. | 408/56 |
| 2005/0169718 A1 * | 8/2005 | Beckington | 408/61 |

* cited by examiner

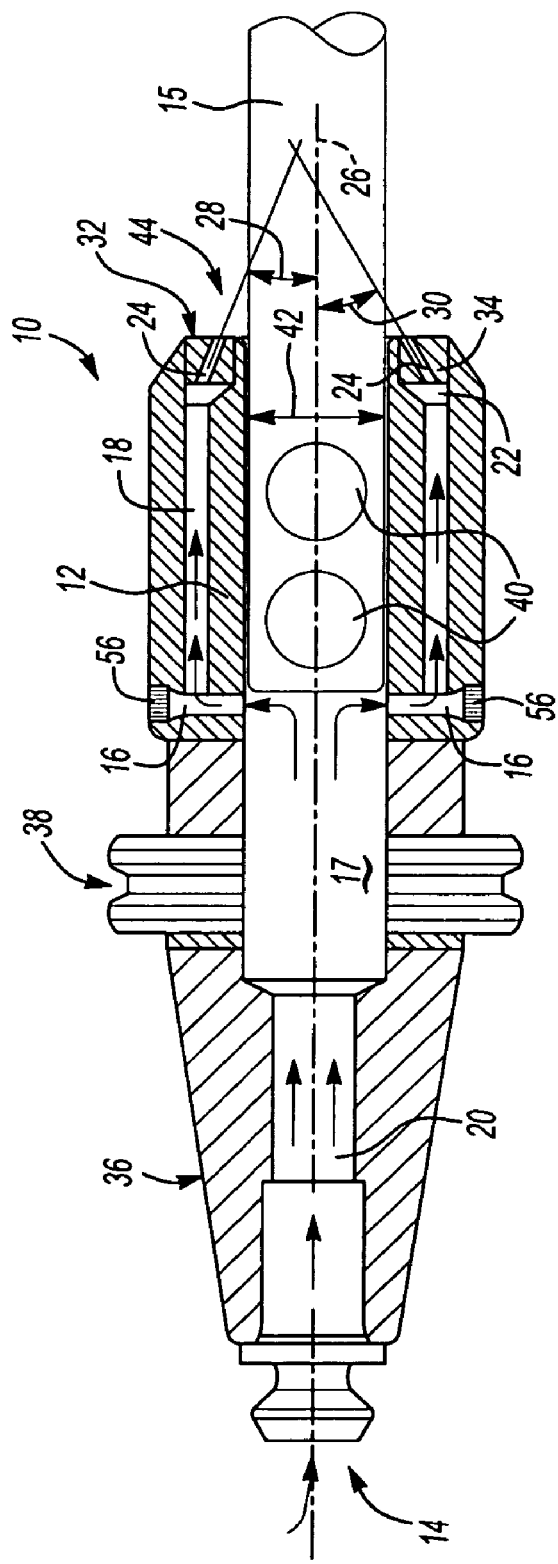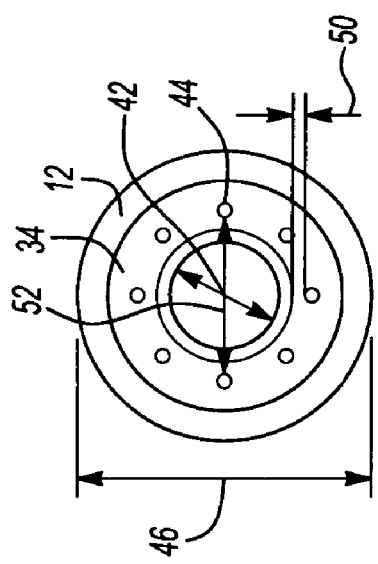

TOOL COOLANT APPLICATION AND DIRECTION ASSEMBLY

REFERENCE TO RELATED APPLICATION

This application is a continuation-in-part of U.S. patent application Ser. No. 11/098,979 filed on Apr. 5, 2005 now abandoned which is a continuation in part of Ser. No. 10/197,390 filed on Jul. 17, 2002 now U.S. Pat. No. 7,134,812.

BACKGROUND OF THE INVENTION

This invention relates to an assembly for directing coolant flow onto a machine tool workpiece, and specifically to an assembly for directing coolant flow onto a tool at different locations along the rotational axis.

Typically, in a conventional machining process a stream of coolant is directed onto the cutting tool to maintain a constant temperature. Without coolant flow, friction from the tool and the workpiece generate heat of a degree sufficient to damage the tool. Further, not only would the tool be damaged, but also the quality of the machined surface of the work piece is degraded. For these reasons it is desirable direct a stream of coolant onto a tool during machining operations. Machining produces metal chips that are preferably evacuated from the machining area in order to prevent damage to the tool and work piece. The stream of coolant aids evacuation of metal chips from the work piece during machining.

Typical arrangements for directing coolant onto a tool include the use of a plurality of hoses arranged to direct fluid onto the tool. These hoses are typically of a semi-rigid design extending around a tool and manually positioned to direct coolant onto a tool. Often during the machining, the work piece or chips bump and contact the coolant lines changing the position of the hose such that the coolant is no longer directed as originally positioned onto the tool. In addition, hoses are often not positionable for providing coolant as desired when machining of relatively deep openings or holes. Further, in some part configurations an adjustable coolant hose is simply not feasible and does not supply and direct coolant flow adequately to the tool.

It is known in the art to provide a system for directing fluid between the machine and spindle to direct flow. Such systems require expensive and complicated fluid routing mechanisms in order to route coolant fluid substantially near the axis of rotation of the tool. Further, such systems are not easily adaptable to tool changes.

Accordingly, it is desirable to provide a low cost, easily changeable and configurable coolant directing assembly that directs coolant along the tool without obstructing machining operations.

SUMMARY OF THE INVENTION

An example tool holder secures a tool and includes an insert that defines passages for directing coolant onto a tool during machining operations.

An example tool holder includes an insert having an annular channel in fluid communication with an inlet defined by the insert pressed into the face of the tool holder. The insert mounts within a body that provides for rigidly mounting the tool to the machine and includes at least one setscrew securing the tool within the tool holder. Coolant flows through the inlet and internal channels and exits the insert through passages directing coolant fluid along the axis of the tool. The passages are annularly disposed about a face of the insert.

Accordingly, the example tool holder provides easy mounting for existing machinery while directing coolant along the entire length of a tool without complex piping and valving and does not interfere with the work piece tool interface during machining.

The various features and advantages of this invention will become apparent to those skilled in the art from the following detailed description of the currently preferred embodiments. The drawings that accompany the detailed description can be briefly described as follows.

BRIEF DESCRIPTION OF THE DRAWINGS

FIG. 1 is a cross-sectional view of an example tool holder.
FIG. 2 if a front view of the example tool holder.

DETAILED DESCRIPTION OF THE PREFERRED EMBODIMENT

Referring to the FIG. 1, an example tool holder assembly 10 holds a tool 15 for use with a machine and includes a body 12 having an inlet 14 through which coolant (indicated by arrows 20) flows to lateral passages 16 that are in turn in fluid communication with coolant passages 18. The coolant passages 18 are in fluid communication with and annular fluid channel 22. The annular fluid channel 22 is in turn in fluid communication with passages 24 within an insert 34. The fluid passages 24 direct coolant along the axis 26. At least two of the coolant passages 24 can be at differing angles 28, 30.

The differing angles of the passages 24 provide for the direction of coolant along different points of the axis 26. Further, the fluid passages 24 can be disposed at the same angle or different angles. The angles 28, 30 are between 2° and 25° relative to the central axis 26, with the disclosed example including an angle of 8°. As appreciated, the angle for the fluid passages 24 can vary as is required to direct fluid through to the tool disposed along the axis 26.

The inlet 14 is disposed at a rear portion of the body 12. The body 12 includes a tapered portion 36 that cooperates with a mount portion 38 of the tool body 12. This configuration is as is known to a worker skilled in the art and may be of differing configuration as is required for the specific application. The inlet 14 is disposed in a rear portion of the body 12 and cooperates with a machine internal coolant system (not shown). In machines equipped with a thru spindle coolant system coolant is provided through the rear of the tool holder 12 to a tool mounted within the inner diameter 42 of the tool holder 10. At least one setscrew 40 is provided to secure the tool 15 within the tool holder 10. The tool 15 preferably will mount within the inner diameter 42 of the tool holder 10. It should be understood that it is within the contemplation of this invention that the tool holder 10 may be modified as is known to a worker skilled in the art to conform and fit differing tool sizes where the inner diameter 42 would be modified to fit tools of differing outer diameters.

The coolant passages 18 are formed by drilling from the annular channel 22 to the lateral passages 16. The lateral passages 16 are formed by drilling from an outer diameter of the tool body 12 to communicate with the inlet passage 17. The lateral passages 16 are then plugged with plugs 56. The coolant passages 18 and lateral passages 16 are formed with a diameter that does not constrict fluid flow. The larger diameters of the coolant passages 18 and lateral passages 16 provide for the use of a relatively large diameter drill. The larger diameter drills are acceptable for drilling the depth of holes required to communicate coolant to the tool 15.

However, the large diameter holes cannot be utilized effectively within the insert 34. Larger outlet openings result in a large fluid flow accompanied by a large drop in pressure. It is desirable to maintain a desired fluid pressure at the openings 44 in order to effectively lubricate and evacuate metal fragments during operation. The insert 34 of this invention provides for the fabrication of smaller openings 44 that maintain the desired pressure of coolant emitted from the face 32.

Referring to FIG. 2 with continued reference to FIG. 1, the insert is fabricated separately form the tool body 12. The example passages 22 are 0.040 inches in diameter to provide the desired pressure of coolant emitted from the face 32. However other diameters may be used to provide the desired pressure and coolant flow. The angle of the example passages is 8° however; other angles as are required to provide the desired lubrication and cooling of the tool 15 are within the contemplation of this invention.

Further the openings 44 are spaced a radial distance 50 from the opening 42 for the tool 15. The radial distance 50 translates to a diameter 52. The radial distance 50 and diameter 52 are determined to provide a desired coolant spray and pattern from the insert face 32. The example radial distance is between 0.10 and 0.50 inches from the tool opening 42. The diameter 52 defined by the circumferentially arranged openings 44 corresponds with the radial distance 50.

The insert 34 is fit into the annular channel 22 and is secured therein to provide a fluid tight interface with the body 12. Installation can include a press fit of the insert 34 into the annular channel 22. The example insert 34 is installed within the annular channel 22 and then brazed to provide secure the insert therein. Other process for securing the insert 34 within the body 12 is also within the contemplation of this invention.

Accordingly, the separately fabricated insert 34 provides for the creation of more and smaller openings to maintain the desired pressure of coolant emitted onto the tool. 15. The resulting smaller and more numerous openings provide the desired pressure at the cutting interface that results in improvements to the final produce along with increasing the durability of the tool 15.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. An endmill tool holder assembly comprising;
   an inlet for cooling fluid;
   a body portion including a bore sized to receive an endmill tool along an axis, said body portion defining sides of an annular channel in fluid communication with said inlet, the bore receiving the tool extends through the body portion and in communication with the inlet for cooling fluid, the body further including a mount portion comprising a circumferential groove and a tapered body portion extending rearward from the mount portion that provides a mating surface for mounting within a machine;
   at least one cross-channel in communication with the bore;
   at least one axial channel in communication with the bore on a first end and the annular channel on a second end for communicating cooling fluid around the tool within the bore and to the annular channel; and
   an insert fit into said annular channel including coolant openings disposed at an angle relative to said axis.

2. The assembly as recited in claim 1, wherein said coolant openings are disposed a radial distance from said opening for mounting said tool.

3. The assembly as recited in claim 2, wherein said radial distance is between 0.1 inches and 0.5 inches from said opening.

4. The assembly as recited in claim 1, wherein at least one coolant opening is disposed at angle different than another of the coolant openings.

5. The assembly as recited in claim 4, wherein said angle of said coolant openings is between 2° and 25° relative to said axis.

6. The assembly as recited in claim 1, wherein the angle of the coolant openings is 8° relative to said axis.

7. The assembly as recited in claim 1, wherein said inlet is disposed along said axis to an opening adjacent a rear end of said body.

8. The assembly as recited in claim 1, wherein the insert is secured within the annular channel of the body portion by a press fit.

9. The assembly as recited in claim 1, wherein the insert is secured within the annular channel by a brazing operation.

10. An endmill tool holder assembly comprising;
    a body portion including a notch extending circumferentially about the body portion and a tapered portion that narrows in a direction rearward from the notch;
    a bore extending through the body portion from an inlet for cooling fluid on a first end to an opening sized to receive an endmill;
    at least one cross-channel transverse to the bore and in fluid communication with the bore;
    a least one axial channel disposed parallel to the bore and extending from the at least one cross-channel to an annular channel;
    an annular channel disposed circumferentially about the opening for the endmill; and
    an insert pressed into the annular channel, the insert including a plurality of openings for directing cooling fluid onto a portion of an endmill extending outward from the bore.

11. The endmill tool holder assembly as recited in claim 10, wherein the axial channel comprises a passage bored through the body portion into fluid communication with the at least one cross-channel.

12. The endmill tool holder assembly as recited in claim 10, wherein the at least two of the plurality of openings are angled differently for directing cooling fluid onto different axial locations onto a tool.

* * * * *